US012634119B2

(12) United States Patent
Bhunia et al.

(10) Patent No.: US 12,634,119 B2
(45) Date of Patent: May 19, 2026

(54) BITSTREAM INITIALIZATION FOR RECONFIGURABLE HARDWARE

(71) Applicant: University of Florida Research Foundation, Incorporated, Gainesville, FL (US)

(72) Inventors: Swarup Bhunia, Gainesville, FL (US); Pravin Dasharth Gaikwad, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 139 days.

(21) Appl. No.: 18/496,278

(22) Filed: Oct. 27, 2023

(65) Prior Publication Data

US 2024/0154788 A1 May 9, 2024

Related U.S. Application Data

(60) Provisional application No. 63/421,385, filed on Nov. 1, 2022.

(51) Int. Cl.
| | |
|---|---|
| *H04L 9/00* | (2022.01) |
| *G06F 11/10* | (2006.01) |
| *G06F 21/60* | (2013.01) |
| *G06N 3/08* | (2023.01) |
| *H04L 9/06* | (2006.01) |

(52) U.S. Cl.
CPC .......... H04L 9/065 (2013.01); G06F 11/1004 (2013.01); G06F 21/602 (2013.01); G06N 3/08 (2013.01)

(58) Field of Classification Search
CPC .... H04L 9/065; G06F 11/1004; G06F 21/602; G06N 3/08
See application file for complete search history.

(56) References Cited

U.S. PATENT DOCUMENTS

| | | | | |
|---|---|---|---|---|
| 8,415,974 B1 * | 4/2013 | Lysaght | ........... | H03K 19/17756 326/39 |
| 2019/0286973 A1 * | 9/2019 | Kovvuri | ............... | G06N 3/0495 |
| 2019/0305927 A1 * | 10/2019 | Bhunia | ................... | G06F 21/76 |

* cited by examiner

*Primary Examiner* — Syed M Ahsan
(74) *Attorney, Agent, or Firm* — Alston & Bird LLP

(57) ABSTRACT

A method and system are directed to generating on-chip bitstreams on reconfigurable hardware. The system comprises a built-in bitstream initialization (BIBI) module configured to generate one or more bitstreams on a semiconductor device. The BIBI module comprising a sequence generator configured to generate a sequence of values for each of the one or more bitstreams, a masking module configured to convert the sequence of values to a given precision of bits, an encryption module configured to apply an encryption scheme to the sequence of values, and an error correction module configured to apply error correction on the sequence of values, wherein the one or more bitstreams are transmitted to a routing network configured to map the one or more bitstreams to input positions of one or more compute blocks.

20 Claims, 9 Drawing Sheets

500

Generate a sequence of values comprising an initial bitstream
502

Convert the sequence of values to a given precision of bits
504

Apply an encryption scheme to the sequence of values
506

Apply error correction on the encrypted sequence of values
508

Generate a final bitstream based on the error-corrected and encrypted sequence of values
510

Transmit the final bitstream to a routing network associated with a semiconductor device
512

400

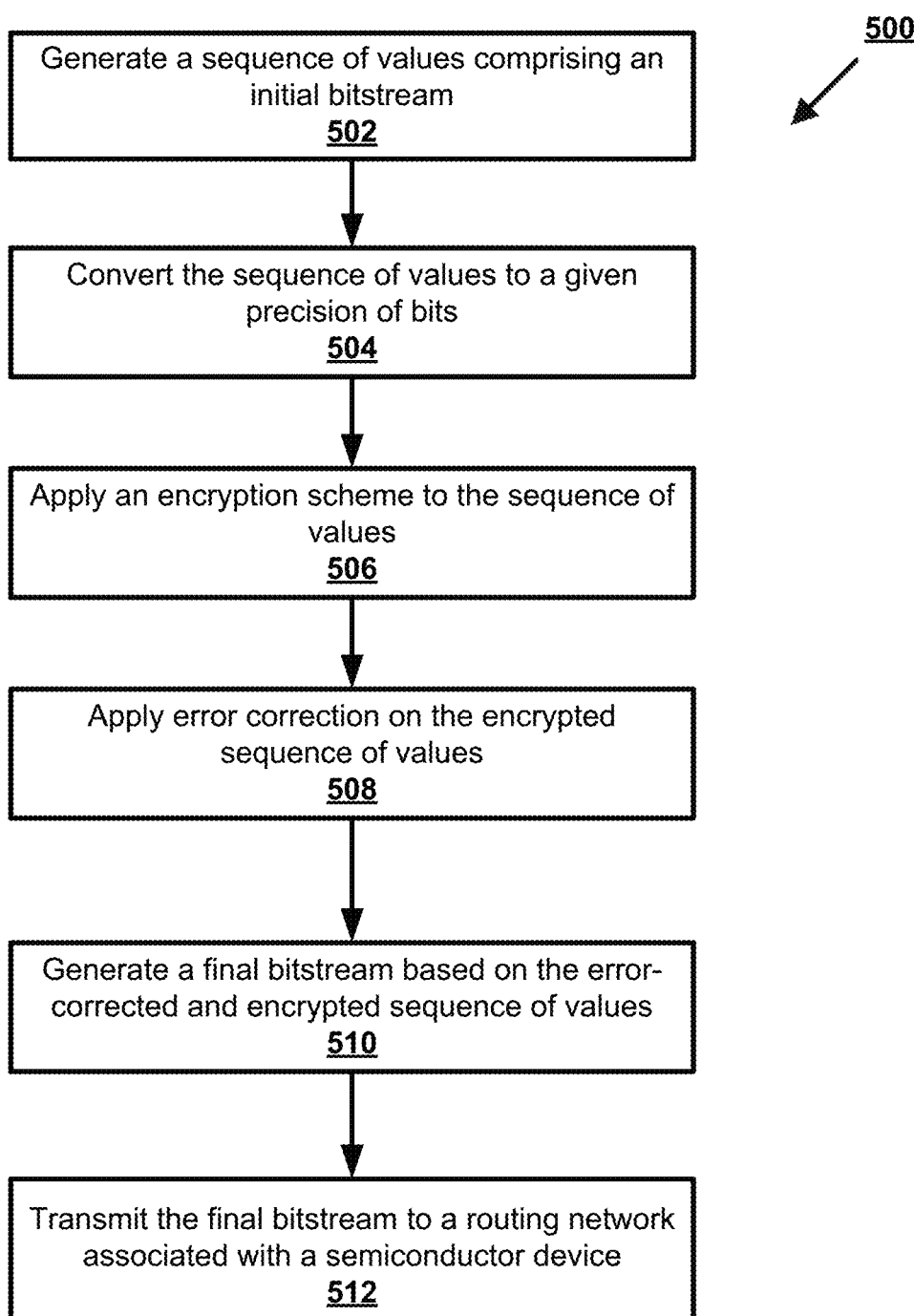

500

Generate a sequence of values comprising an
initial bitstream
502

Convert the sequence of values to a given
precision of bits
504

Apply an encryption scheme to the sequence of
values
506

Apply error correction on the encrypted
sequence of values
508

Generate a final bitstream based on the error-
corrected and encrypted sequence of values
510

Transmit the final bitstream to a routing network
associated with a semiconductor device
512

FIG. 5

BITSTREAM INITIALIZATION FOR RECONFIGURABLE HARDWARE

CROSS REFERENCE TO RELATED APPLICATION

This application claims the priority of U.S. Provisional Application No. 63/421,385, entitled "BITSTREAM INITIALIZATION FOR RECONFIGURABLE HARDWARE," filed on Nov. 1, 2022, the disclosure of which is hereby incorporated by reference in its entirety.

TECHNICAL FIELD

The present application relates to generating bitstreams for reconfigurable hardware devices, and more particularly to a system module for providing on-chip bitstream generation functionality.

BACKGROUND

Reconfigurable hardware has many uses that range from automobiles to nuclear systems. Examples of devices comprising reconfigurable hardware platforms include field-programmable gate arrays (FPGAs) or embedded FPGAs (e-FPGAs) used in application-specific integrated circuits (ASICs). However, such reconfigurable hardware must be configured with a bitstream to enact various operations.

For an FPGA to perform a particular operation, the FPGA may be configured with a related bitstream. Bitstreams are generally developed by third-party intellectual property (3PIP) vendors. Bitstreams procured from 3PIP vendors may not be trusted. For example, 3PIP vendors may implant hardware Trojan horses (HTHs) in the bitstreams to cause unintended malicious activity at run-time. Such HTHs remain dormant during the testing and initial phases of operation may be activated at runtime after a pre-decided number of operations to jeopardize crucial operations.

Along with security, timing and storage issues are other areas of concern. Storing several bitstreams on or off-chip requires a lot of space. As an FPGA can be associated with multiple operations, multiple bitstreams may need to be stored. Due to low storage area in a reconfigurable hardware platform device, bitstreams are generally stored in off-chip memories and transferred to the reconfigurable hardware platform device when needed. However, the time to transfer the bitstreams from off-chip memory to the FPGA may add to the timing overhead of the system.

Moreover, adversaries may intercept the bitstreams while being transferred from the off-chip memory to the FPGAs. Confidential information of bitstreams may be leaked during their transit from off-chip memory to the FPGA. Adversaries may intercept the bitstreams via covert channels during transit. In such a scenario, the adversary may either duplicate the entire bitstream or steal confidential information from the bitstream.

Thus, there is a need to mitigate the aforementioned issues, and provide bitstreams that can be initialized on-chip.

BRIEF SUMMARY

Various embodiments described herein relate to methods, apparatuses, and systems for generating bitstreams directly on reconfigurable hardware platform devices. The disclosed embodiments may employ a built-in bitstream initialization (BIBI) framework for reconfigurable hardware platform devices. In some embodiments, the BIBI framework may comprise an on-chip system module that is applicable for FPGA-based systems as well as ASIC systems. The on-chip system module may be integrated at design time, and based on various application scenarios, exact or approximate configuration bitstreams may be generated. The on-chip system module may generate a precise bitstream sequence at design time and create appropriate connections to configurable logic blocks.

In some embodiments, the on-chip system module may generate weights for neural network applications associated with approximate computing operations. A bitstream sequence may be generated by the on-chip system module in a way to minimize routing complexity and comply with fanout constraints. Feedback from routing may be used to iteratively modify the generated bitstream sequence.

According to various embodiments of the present disclosure, the BIBI framework may comprise masking, encryption, error correction, and routing functionalities. Masking may comprise an operation that aids accuracy in a generated bitstream to a desired precision. Encryption may comprise add-on security when critical operations are associated. Error correction may comprise mitigating fault and ensuring accuracy. Routing may map generated values to exact points of a configured design.

According to one embodiment, a system comprises a BIBI module configured to generate one or more bitstreams on a semiconductor device. The BIBI module comprises a sequence generator configured to generate a sequence of values for each of the one or more bitstreams, a masking module configured to convert the sequence of values to a given precision of bits, an encryption module configured to apply an encryption scheme to the sequence of values, and an error correction module configured to apply error correction on the sequence of values; and wherein the one or more bitstreams are transmitted to a routing network configured to map the one or more bitstreams to input positions of one or more compute blocks.

In some embodiments, the bitstream comprises data representative of a description of hardware, logic, routing, and initial values for registers and on-chip memory including look-up tables. In some embodiments, the bitstream data configures the semiconductor device to perform one or more programmable functionalities. In some embodiments, the semiconductor device comprises a field-programmable gate array or an application-specific integrated circuit. In some embodiments, the sequence generator comprises a linear feedback shift register or a non-linear feedback shift register. In some embodiments, the sequence generator is configured to generate a sequence of values based on sequence generating parameters associated with seed, structure, and size. In some embodiments, the BIBI module is further configured to generate the one or more bitstreams at a time of design and generate connections to configurable logic blocks of the one or more compute blocks. In some embodiments, the BIBI module is further configured to generate weights for a neural network associated with computing operations.

According to one embodiment, a method comprises generating, by one or more processors, a sequence of values comprising an initial bitstream; converting, by the one or more processors, the sequence of values to a given precision of bits; applying, by the one or more processors, an encryption scheme to the sequence of values; applying, by the one or more processors, error correction on the encrypted sequence of values; generating, by the one or more processors, a final bitstream based on the error-corrected and encrypted sequence of values and one or more check-bits; and transmitting, by the one or more processors, the final bitstream to a routing network, the routing network configured to map the final bitstream to one or more input positions associated with one or more compute blocks.

In some embodiments, the method further comprises generating the sequence of values based on one or more sequence generating parameters. In some embodiments, the one or more sequence generating parameters comprises a seed configuration or a linear feedback shift register configuration. In some embodiments, the one or more compute blocks comprises one or more configurable logic blocks. In some embodiments, the initial bitstream comprises data representative of a description of hardware, logic, routing, and initial values associated with one or more registers and on-chip memory comprising one or more look-up tables. In some embodiments, the final bitstream configures a semiconductor device associated with the one or more compute blocks to perform one or more programmable functionalities.

According to another aspect of the present disclosure, a method is provided for identifying sequence generating parameters for a BIBI framework. According to one embodiment, the method comprises receiving one or more input values associated with a functionality requirement, iteratively varying values of one or more sequence generating parameters for a given number of iterations, each iteration comprising: determining a difference between values of the one or more sequence generating parameters and the one or more input values, and for each iteration where the difference is less than a minimum distance variable: the minimum distance variable is updated with the difference, and one or more minimum distance sequence generating parameter values are updated with the one or more sequence generating parameters; and generating the one or more minimum distance sequence generating parameter values as output, the output used to configure bitstream generation on a semiconductor device.

In some embodiments, the one or more sequence generating parameters comprise seed, structure, and size. In some embodiments, the one or more minimum distance sequence generating parameter values comprise values of the one or more sequence generating parameters representative of sequence generating parameters that are closest to the input values. In some embodiments, the functionality requirement comprises design constraints, requirements, or specifications of a particular functionality to be programmed to the semiconductor device. In some embodiments, the difference comprises a similarity comparison or a measure of the one or more values of the one or more sequence generating parameters with respect to matching the one or more input values. In some embodiments, the method further comprises transmitting the output as control input to the semiconductor device, wherein the semiconductor device comprises a built-in bitstream initiation module configured to generate one or more bitstreams based on the output.

BRIEF DESCRIPTION OF THE DRAWINGS

Embodiments incorporating teachings of the present disclosure are shown and described with respect to the figures presented herein.

FIG. 5 illustrates a flowchart of an example process for generating a secure bitstream in accordance with some embodiments discussed herein.

DETAILED DESCRIPTION

Figure 1:
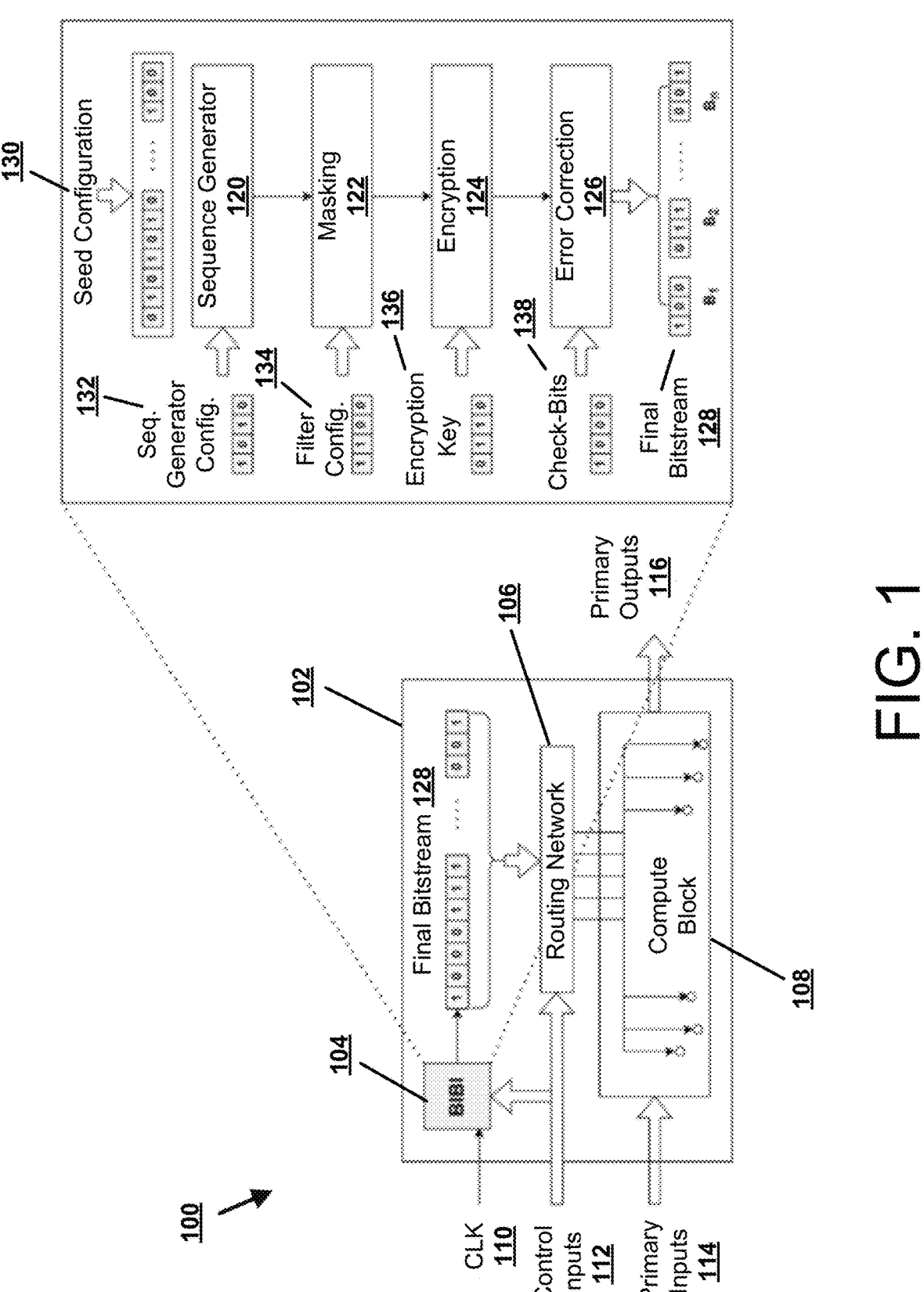
FIG. 1 illustrates a schematic diagram of an exemplary reconfigurable hardware platform in accordance with some embodiments discussed herein.

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

General Overview and Exemplary Technical Improvements

The present application discloses a system comprising a built-in bitstream initialization (BIBI) framework for reconfigurable hardware platform devices. The BIBI framework may comprise a BIBI module for generating bitstreams directly on reconfigurable hardware platform devices. Reconfigurable hardware platform devices may comprise circuit devices including logic gates in which functionality of the logic gates is customizable at run-time and connections between the logic gates are also configurable. The disclosed BIBI module may include a sequence generator comprising a linear feedback shift register (LFSR) or a non-linear feedback shift register (NLFSR). A sequence of values may be generated by the disclosed sequence generator. The sequence of values may then be masked, encrypted, and error corrected as per a given application requirement and routed to appropriate locations within a reconfigurable hardware platform device as a bitstream. As such, the disclosed BIBI framework obviates the problems associated with procuring bitstreams from untrusted 3PIP vendors, threats associated with storing bitstreams in off-chip memories, and related attacks associated with their traversal from off-chip memories at run-time.

In one embodiment, a BIBI module may be integrated on a reconfigurable hardware platform device. The BIBI module may be configured to generate bitstreams for configuring the reconfigurable hardware platform device with programmable functionalities. The BIBI module may comprise a sequence generator that is modulated based on sequence generating parameters. For example, in accordance with various embodiments of the present disclosure, the sequence generator may be modulated based on seed, structure, and size. As such, the sequence generator may generate a sequence of values based on the values of the seed, structure, and size. The sequence of values generated by the sequence generator may be optionally masked, encrypted, and error corrected as per functionality requirement and routed to appropriate places as a bitstream in the reconfigurable hardware platform device. For example, bitstream values generated by the sequence generator may be masked to generate bitstreams or weights (e.g., for neural network applications) near desired/required values. In some embodiments, error correction may be performed to obtain more exact values.

Benefits of the disclosed system may include:

Security: When a bitstream is initialized directly on an operating chip (e.g., a reconfigurable hardware platform device), neither will the bitstream be associated with HTHs from untrusted 3PIP vendors, nor adversaries be able to intercept the bitstream during transit from off-chip memories.

Reduced Storage Requirement: With an on-chip bitstream initialization module, the storage requirement of bitstreams related to various applications and functionalities may be drastically reduced.

Reduced Timing: In addition, as bitstream is initialized directly on the operating chip, timing overhead related to bitstream traversal is obviated.

Ease of Programming: A device comprising a reconfigurable hardware platform may be reprogrammed according to different applications and functionalities based on varying sequence generating parameters (e.g., seed, structure, and size).

Exemplary Technical Implementation of Various Embodiments

Embodiments of the present disclosure may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described with reference to example operations, steps, processes, blocks, and/or the like. Thus, it should be understood that each operation, step, process, block, and/or the like may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments may produce specifically configured machines performing the steps or operations specified in the block diagrams and flowchart illustrations. Accordingly, the block diagrams and flowchart illustrations support various combinations of embodiments for performing the specified instructions, operations, or steps.

Exemplary Reconfigurable Hardware Platform

FIG. 1 is a schematic diagram of an exemplary reconfigurable hardware platform 100 in accordance with some embodiments discussed herein. The reconfigurable hardware platform 100 may comprise a semiconductor device 102 including electronic circuits, such as FPGA and ASIC. The semiconductor device 102 may be configured according bitstreams to perform given functions, such as generating primary outputs 116 based on primary inputs 114, control inputs 112, and CLK signal 110. A bitstream may comprise data or a file including information representative of a description of hardware, logic, routing, and initial values for registers and on-chip memory (e.g., look-up tables) used to configure semiconductor device 102. In one embodiment, the bitstream may be structured in a binary format.

According to the illustrated embodiment, semiconductor device 102 comprises BIBI module 104, routing network 106, and compute block 108. BIBI module 104 may be configured to generate bitstreams for configuring the semiconductor device 102 to perform one or more programmable functionalities. The BIBI module 104 comprises a sequence generator 120, a masking module 122, an encryption module 124, and an error correction module 126.

Sequence generator 120 may comprise a finite state machine (FSM), a LFSR, or a NLFSR, configured to generate a sequence of values (e.g., a bitstream). In some embodiments, a LFSR or a NLFSR may be preferred as they may be easily configured to create new sequences and are harder to predict by an attacker given the many possible configurations the LFSR or NLFSR may provide. Thus, making it more difficult for an attacker to predict and clone the sequences of values generated by a LFSR or NLFSR. The sequence generator 120 may generate a sequence of values representative of a bitstream based on seed configuration bits 130 and sequence generator configuration bits 132. Seed configuration bits 130 may comprise an initial seed of input bit values for initializing registers of sequence generator 120. One or more operations may be performed on the seed configuration bits 130 according to the sequence generator configuration bits 132 to generate a bitstream for a given functionality.

Masking module 122 may be configured to convert the sequence of values, generated by the sequence generator 120, to a given precision of bits. For functionalities associated with approximate computations, accuracy up to a certain precision may be needed. The masking module 122 may generate masks based on a functionality required for bitstreams produced by the sequence generator 120. For example, a functionality may require a precision of up to the first four most significant bits to be '1111,' which may be provided to masking module 122 via filter configuration bits 134. As such, an 8-bit bitstream may be generated whose first four most significant bits is '1111' by applying a 4-bit XOR mask to obtain the desired value. Given an 8-bit value of a bitstream is '01011110,' then the value of the XOR mask should be '1010' to get the desired value of '11111110.'

Encryption module 124 may be configured to apply an encryption scheme to a bitstream, for example, after masking a sequence of values by the masking module 122. As an example, the encryption module 124 may apply an XOR-based encryption scheme for an FPGA implementation, and if high security is needed, advanced encryption standard (AES) and data encryption standard (DES) algorithms may be applied based on encryption key bits 136.

Error correction module 126 may be configured to apply, for example, one-bit and two-bit error correction on the sequence of values to obtain accurate bitstreams. Check-bits 138 may be added to a bitstream to allow for the detection and correction of errors.

A final bitstream 128 may be generated based on a combination of operations performed on a sequence of values, generated by sequence generator 120, by masking module 122, encryption module 124, and error correction module 126. In one embodiment, a final bitstream 128 may comprise a bitstream include a sequence of values obtained directly from sequence generator 120, e.g., without passing through any of masking module 122, encryption module 124, and error correction module 126.

Control inputs 112 are provided to the BIBI module 104 and the routing network 106. The control inputs 112 may comprise sequence generating parameters and mapping configurations. Sequence generating parameters may be received and used by BIBI module 104 to configure sequence generator 120. For example, sequence of values generated by the sequence generator 120 may be based on seed, structure, and size sequence generating parameters.

Mapping configurations may be received by routing network 106 to create appropriate connections to compute block 108 for bitstreams generated by BIBI module 104 considering provided design constraints, such as maximum fanout of a net and maximum routing distance. According to various embodiments of the present disclosure, the routing network 106 may be configured to map the final bitstream 128 to appropriate input positions of the compute block 108 (e.g., a programmed functionality on a FPGA). The compute block 108 may comprise a programmable logic unit of the semiconductor device 102. For neural network-based applications, values of the final bitstream 128 may be mapped to registers that contain weights. While for configurable logic designing, values of the final bitstream 128 may be mapped to configurable selection inputs. As will be recognized, these architectures and descriptions are provided for exemplary purposes only and are not limiting to the various embodiments.

Figure 2:
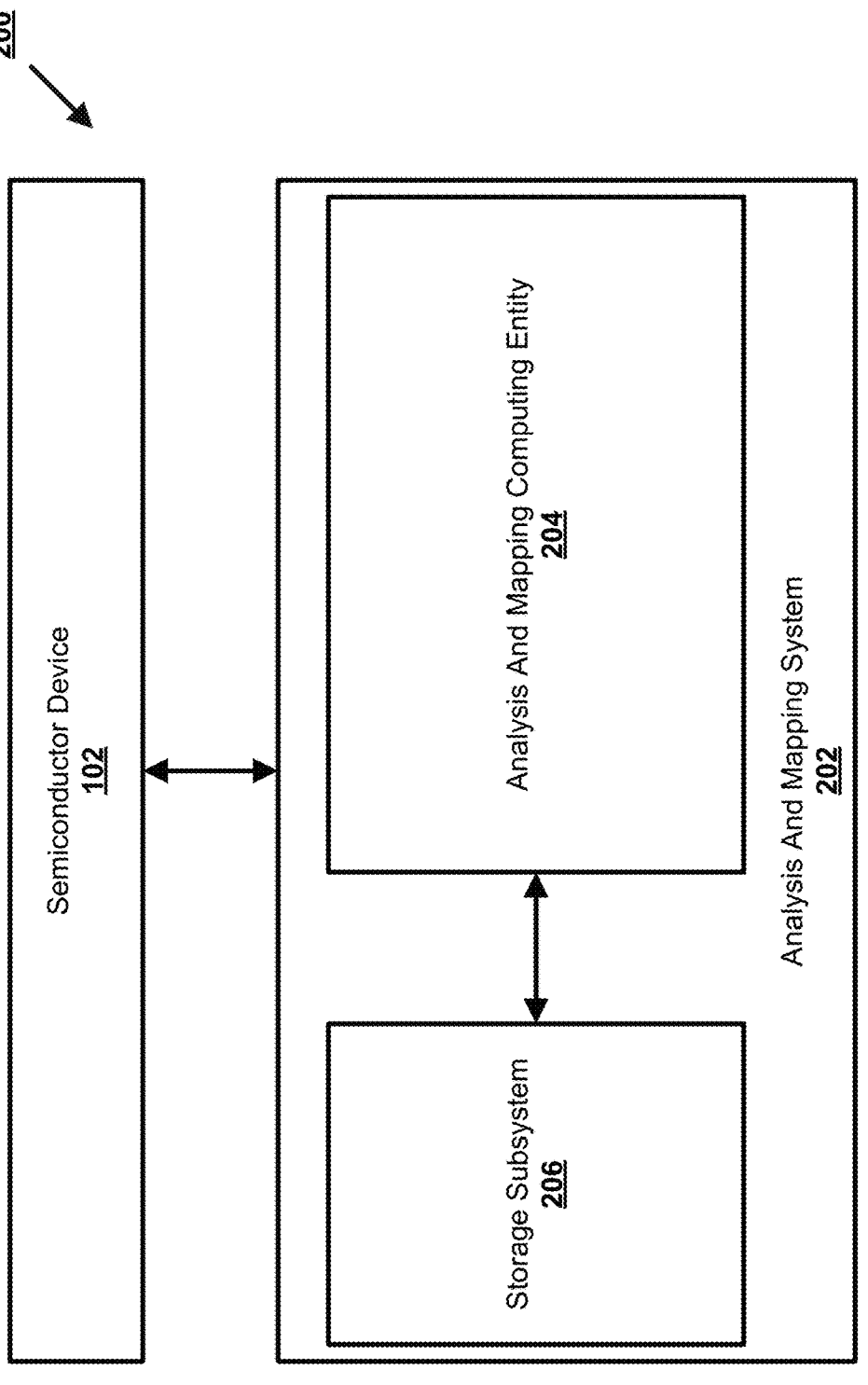
FIG. 2 illustrates schematic diagram of an example architecture in accordance with some embodiments discussed herein.

The control inputs 112 may be transmitted to the BIBI module 104 and the routing network 106 from, for example, an analysis and mapping system. According to various embodiments of the present disclosure, an analysis and mapping system may receive input values for implementing a particular functionality by the reconfigurable hardware platform 100 and identify one or more sequence generating parameters based on the input values. The input values may comprise design constraints, requirements, or specifications of a particular functionality for semiconductor device 102. The analysis and mapping system may identify particular values for the sequence generating parameters that are closest to the input values for the particular functionality. For example, a combination of sequence generating parameters including seed, structure, and size may be selected such that they are closest to the input values.
Exemplary Hardware Configurator Architecture FIG. 2 is a schematic diagram of an example architecture 200 for configuring a BIBI module 104 on a semiconductor device 102 (comprising a reconfigurable hardware platform) to generate bitstreams within the semiconductor device 102 in accordance with some embodiments discussed herein. The architecture 200 includes an analysis and mapping system 202 configured to generate control inputs 112 for semiconductor device 102 based on input values associated with functionality that is programmed on semiconductor device 102. For example, the input values may comprise design constraints, requirements, or specifications of a particular functionality.

In accordance with various embodiments of the present disclosure, BIBI module 104 may be integrated on reconfigurable hardware platform devices, such as semiconductor device 102, to facilitate on-chip generation of bitstreams directly on the reconfigurable hardware platform devices. Accordingly, the disclosed BIBI module 104 obviates the problems associated with procuring bitstreams from untrusted 3PIP vendors, threats associated with storing bitstreams in off-chip memories, and related attacks associated with their traversal from off-chip memories at run-time.

In some embodiments, an analysis and mapping system 202 may communicate with at least one the semiconductor device 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The analysis and mapping system 202 may include an analysis and mapping computing entity 204 and a storage subsystem 206. The analysis and mapping computing entity 204 may identify values of sequence generating parameters that are closest to input values for a particular functionality. For example, a combination of sequence generating parameters including seed, structure, and size may be selected such that they are closest to the input values.

In accordance with various embodiments of the present disclosure, the control inputs 112 may comprise sequence generating parameters that are identified by the analysis and mapping computing entity 204 varying one or more sequence generating parameters to match the input values. The control inputs 112 may further comprise mapping configurations for mapping bitstream values generated by the BIBI module 104. The mapping configurations may allow for appropriate connections and routing of bitstream values given design constraints, such as maximum fanout of a net and maximum routing distance.

Figure 3:
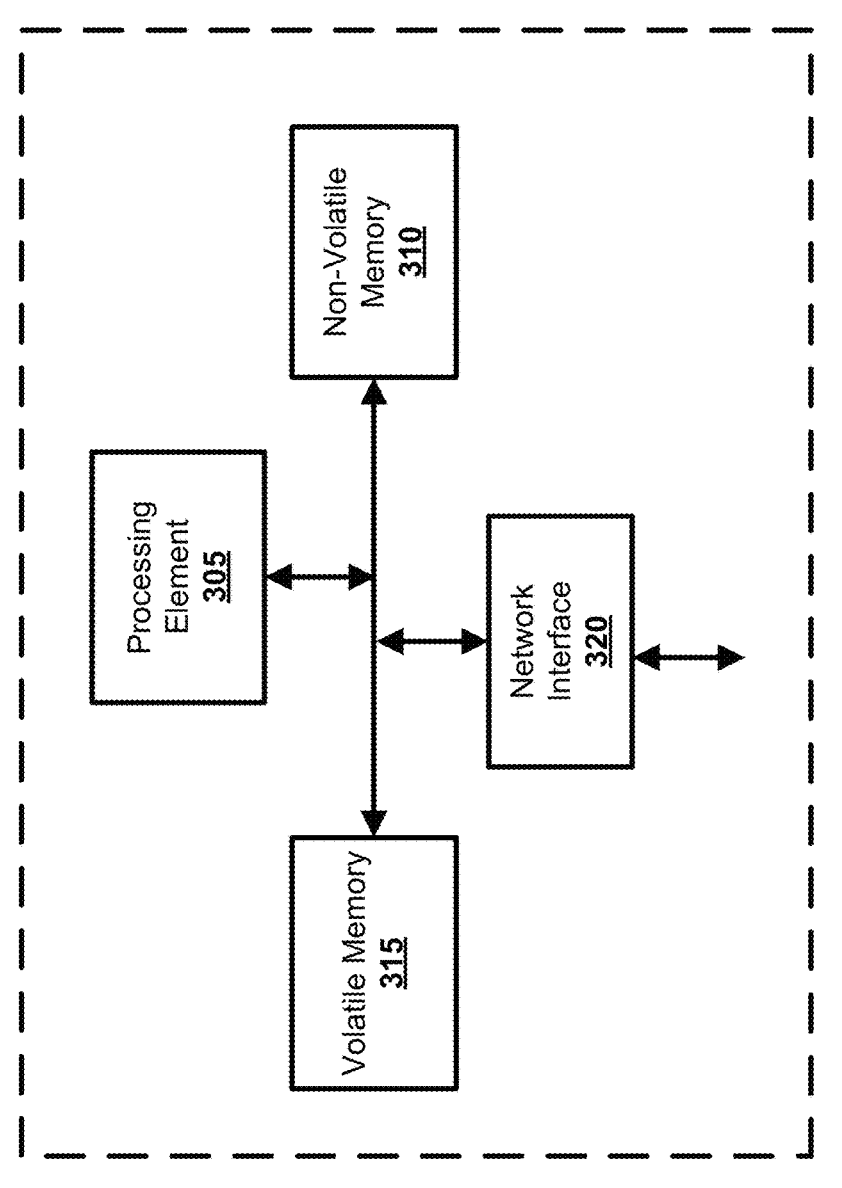
FIG. 3 illustrates a schematic of an analysis and mapping computing entity in accordance with some embodiments discussed herein.

The storage subsystem 206 may be configured to store input data used by the analysis and mapping computing entity 204 to identify control inputs comprising sequence generating parameters. The storage subsystem 206 may include one or more storage units, such as multiple distributed storage units that are connected through a computer network. Each storage unit in the storage subsystem 206 may store at least one of one or more data assets and/or one or more data about the computed properties of one or more data assets. Moreover, each storage unit in the storage subsystem 206 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.
Exemplary Analysis and Mapping Computing Entity FIG. 3 provides a schematic of an analysis and mapping computing entity 204 according to one embodiment of the present disclosure. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes may be performed on data, content, information, and/or similar terms used herein interchangeably.

As indicated, in one embodiment, the analysis and mapping computing entity 204 may also include one or more network interfaces 320 for communicating with various computing entities, such as by communicating data, content, information, and/or similar terms used herein interchangeably that may be transmitted, received, operated on, processed, displayed, stored, and/or the like.

As shown in FIG. 3, in one embodiment, the analysis and mapping computing entity 204 may include, or be in communication with, one or more processing elements 305 (also referred to as processors, processing circuitry, and/or similar terms used herein interchangeably) that communicate with other elements within the analysis and mapping computing entity 204 via a bus, for example. As will be understood, the processing element 305 may be embodied in a number of different ways.

For example, the processing element 305 may be embodied as one or more complex programmable logic devices (CPLDs), microprocessors, multi-core processors, coprocessing entities, application-specific instruction-set processors (ASIPs), microcontrollers, and/or controllers. Further, the processing element 305 may be embodied as one or more other processing devices or circuitry. The term circuitry may refer to an entirely hardware embodiment or a combination of hardware and computer program products. Thus, the processing element 305 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 305 may be configured for a particular use or configured to execute instructions stored in volatile or non-volatile media or otherwise accessible to the processing element 305. As such, whether configured by hardware or computer program products, or by a combination thereof, the processing element 305 may be capable of performing steps or operations according to embodiments of the present disclosure when configured accordingly.

In one embodiment, the analysis and mapping computing entity 204 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 310, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the analysis and mapping computing entity 204 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 315, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 305.

Thus, the databases, database instances, database management systems, data, applications, programs, program modules, scripts, source code, object code, byte code, compiled code, interpreted code, machine code, executable instructions, and/or the like may be used to control certain aspects of the operation of the analysis and mapping computing entity 204 with the assistance of the processing element 305 and operating system.

As indicated, in one embodiment, the analysis and mapping computing entity 204 may also include one or more network interfaces 320 for communicating with various computing entities, such as by communicating data, content, information, and/or similar terms used herein interchangeably that may be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the analysis and mapping computing entity 204 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the analysis and mapping computing entity 204 may include, or be in communication with, one or more input elements, such as a keyboard input, a mouse input, a touch screen/display input, motion input, movement input, audio input, pointing device input, joystick input, keypad input, and/or the like. The analysis and mapping computing entity 204 may also include, or be in communication with, one or more output elements (not shown), such as audio output, video output, screen/display output, motion output, movement output, and/or the like.

Exemplary System Operations

Various embodiments of the present disclosure describe steps, operations, processes, methods, functions, and/or the like for determining sequence generating parameters for a given functionality. Sequence generating parameters may be transmitted to a semiconductor device 102 as control inputs 112 and used by BIBI module 104 to modulate a sequence generator 120. In particular, the sequence generator may be modulated with the sequence generating parameters to generate a sequence of values for a bitstream for configuring semiconductor device 102 with the given functionality.

Figure 4:
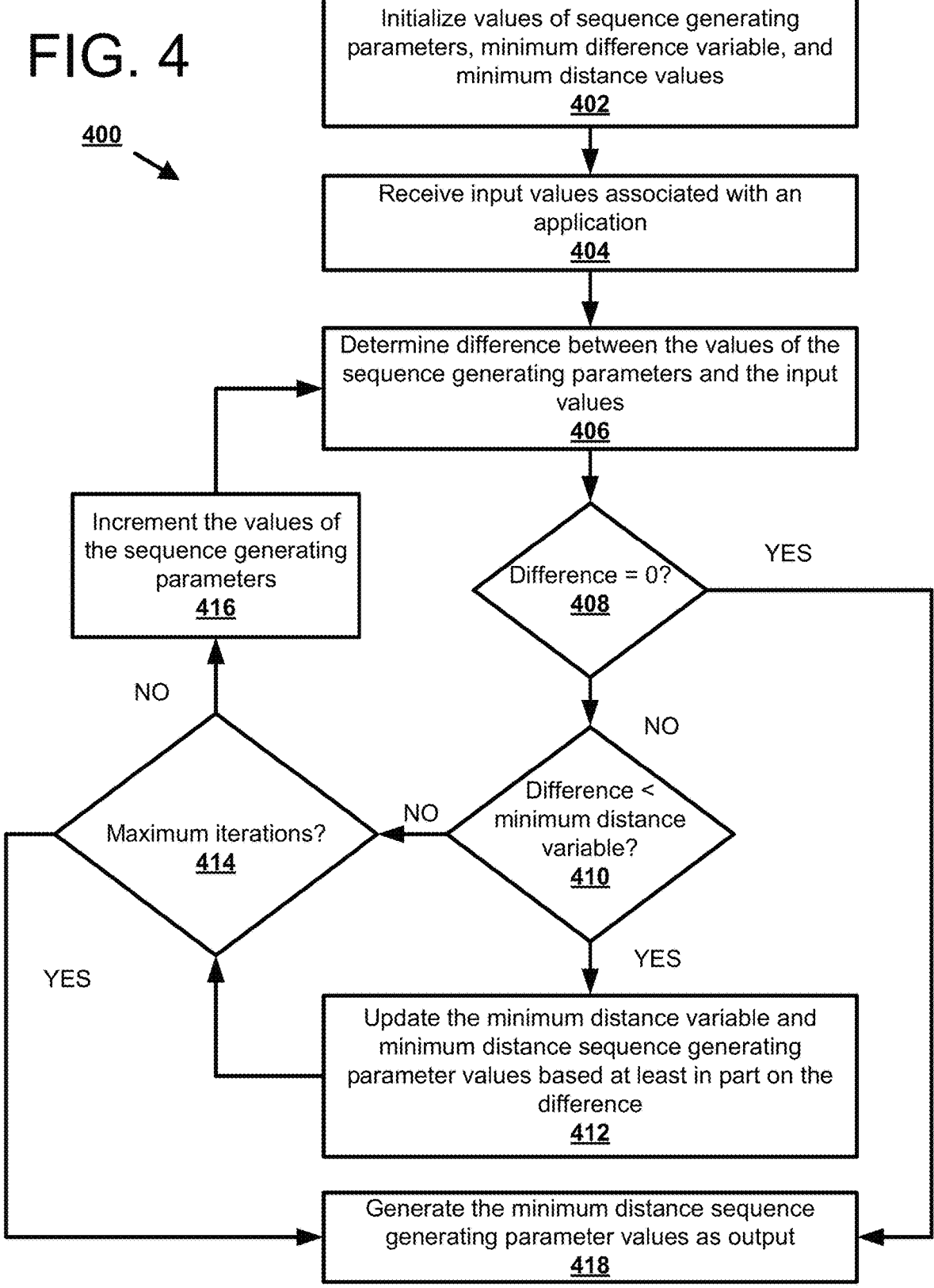
FIG. 4 illustrates a flowchart of an example process for identifying sequence generating parameters for a BIBI framework in accordance with some embodiments discussed herein.

FIG. 4 presents a flowchart of an example process 400 for identifying sequence generating parameters for a BIBI framework in accordance with some embodiments discussed herein. The process 400 includes example operations that may be performed by an analysis and mapping system 202.

In some embodiments, the process 400 begins at step/operation 402 when the analysis and mapping computing entity 204 initializes a value associated with each of one or more sequence generating parameters, a minimum distance variable, and one or more minimum distance sequence generating parameter values. The one or more sequence generating parameters may comprise, for example, seed parameters, structure parameters, and size parameters. A seed parameter may comprise initial values used, e.g., by sequence generator 120, to generate a sequence of values. A structure parameter may comprise a specification for defining bitstream structure or format associated with an architecture of a target device (e.g., semiconductor device 102). A size parameter may comprise a specification for defining a number of bits, frame size, or a quantity of values associated with a bitstream generated for the target device. According to various embodiments of the present disclosure, the values of the one or more sequence generating parameters may be initialized with predetermined values or with minimum values, and subsequently varied and/or incremented, as disclosed further herewith.

The minimum distance variable may comprise a dynamic data object used to track a measure of distance between the values of the one or more sequence generating parameters and one or more input values associated with a functionality for implementation on semiconductor device 102. The minimum distance variable may be initialized with a predetermined value (e.g., a highest distance value) that may be subsequently decreased to identify a minimum distance between the values of the one or more sequence generating parameters and the one or more input values, as disclosed further herewith.

The one or more minimum distance sequence generating parameter values may comprise values of the one or more sequence generating parameters that are representative of sequence generating parameters that are closest to the input values. The one or more minimum distance sequence generating parameter values may be set to the values associated with each of the one or more sequence generating parameters at initialization and subsequently updated based on an update to the minimum distance variable.

In some embodiments, at step/operation 404, the analysis and mapping computing entity 204 receives one or more input values associated with a functionality requirement. The functionality requirement may comprise design constraints, requirements, or specifications of a particular functionality to be programmed to the target device.

In some embodiments, at step/operation 406, the analysis and mapping computing entity 204 determines a difference between the values of the sequence generating parameters and the input values. The difference may comprise a similarity comparison or a measure of how well the values of the sequence generating parameters match the input values. Determining the difference may include, for example, determining whether a bitstream generated according to the sequence generating parameters would satisfy functionality based on the input values. As an example, a verification system, such as a testbench or simulator environment, may utilized to generate proof that a particular bitstream matches specifications associated with the input values. According to various embodiments of the present disclosure, the difference between the values of the sequence generating parameters and the input values may be determined for a given number of possible values and value combinations of the sequence generating parameters.

In some embodiments, at step/operation 408, the analysis and mapping computing entity 204 determines whether the difference between the values of the sequence generating parameters and the input values is '0.' If the difference between the values of the sequence generating parameters and the input values is '0,' the analysis and mapping computing entity 204, at step/operation 418, generates the one or more minimum distance sequence generating parameter values as output. For example, the difference being '0' may be representative of no difference between the values of the sequence generating parameters and the input values. The output comprising the minimum distance sequence generating parameters values may be included as part of control input transmitted to semiconductor device 102 and used by the BIBI module 104 to generate one or more bitstreams.

Otherwise, if the difference between the values of the sequence generating parameters and the input values is not '0,' the analysis and mapping computing entity 204, in some embodiments, at step/operation 410, determines whether the difference between the values of the sequence generating parameters and the input values is less than a current value of the minimum distance variable. According to various embodiments of the present disclosure, the analysis and mapping computing entity 204 determines values of the sequence generating parameters that are minimally different from the input values by comparing the values of the sequence generating parameters with the minimum distance variable.

In some embodiments, at step/operation 412, the analysis and mapping computing entity 204, updates the minimum distance variable and the one or more minimum distance sequence generating parameter values based on whether the difference between the values of the sequence generating parameters and the input values is less than a current value of the minimum distance variable. If the difference between the values of the sequence generating parameters and the input values is less than the current value of the minimum distance variable, the minimum distance variable and the one or more minimum distance sequence generating parameter values are updated. Otherwise, if the difference between the values of the sequence generating parameters and the input values is not less than a current value of the minimum distance variable, the minimum distance variable and the one or more minimum distance sequence generating parameter values are not updated.

In some embodiments, at step/operation 414, the analysis and mapping computing entity, determines whether a maximum amount of iterations have been reached. The maximum amount of iterations may comprise a predetermined value that may be user-configured or a value corresponding to a maximum amount of possible combinations that may be tried for the sequence generating parameters. Values for the sequence generating parameters may be varied and/or incremented to obtain values for the sequence generating parameters that have '0' difference with the input values or have a minimum difference value. As such, a plurality of values of the sequence generating parameters may be compared with the input value through a plurality of iterations up to the maximum amount of iterations.

If a maximum amount of iterations has not been reached, the analysis and mapping computing entity 204, in some embodiments, at step/operation 416, increments the values of the sequence generating parameters. For example, values of sequence generating parameters comprising seed, structure, and size are varied from minimum to maximum values. The analysis and mapping computing entity 204 may repeat the steps/operations 406 through 414 after incrementing the values of the sequence generating parameters at step/operation 416.

If the maximum amount of iterations has been reached, the analysis and mapping computing entity 204, in some embodiments, at step/operation 418, generates the minimum distance sequence generating parameter values as output. As such, the sequence generating parameter values that are determined to be minimally different from the input values, as described above, are generated as the output, e.g., to be provided as control inputs 112 that is used by semiconductor device 102 to configure BIBI module 104 (e.g., to generate sequence values of a bitstream) and the routing network 106 (e.g., to map a bitstream to appropriate inputs).

FIG. 5 presents a flowchart of an example process 500 for generating a secure bitstream in accordance with some embodiments discussed herein. The process 500 includes example operations that may be performed by an analysis and mapping system 202.

In some embodiments, the process 500 begins at step/operation 502 when the analysis and mapping computing entity 204 generates a sequence of values comprising an initial bitstream. The sequence of values may be generated based on one or more sequence generating parameters. In some embodiments, the one or more sequence generating parameters comprise a seed configuration or a LFSR configuration. For example, a programmable LFSR/NLFSR unit may be configured to generate initial bitstream values based on bits associated with a seed configuration and LFSR configuration bits.

The initial bitstream may comprise data representative of a description of hardware, logic, routing, and initial values associated with one or more registers and on-chip memory comprising one or more look-up tables.

In some embodiments, at step/operation 504, the analysis and mapping computing entity 204 converts the sequence of values to a given precision of bits. Converting the sequence of values may comprise generating masks based on a precision of bits for a required functionality.

In some embodiments, at step/operation 506, the analysis and mapping computing entity 204 applies an encryption scheme to the sequence of values. For example, the encryption scheme may comprise an XOR-based encryption scheme for an FPGA implementation, or AES/DES algorithms for high security applications.

In some embodiments, at step/operation 508, the analysis and mapping computing entity 204 applies error correction on the encrypted sequence of values. The error correction may be used to correct bits of the encrypted sequence of values with check-bits to derive a final bitstream.

In some embodiments, at step/operation 510, the analysis and mapping computing entity 204 generates a final bitstream based on the error-corrected and encrypted sequence of values and one or more check-bits.

In some embodiments, at step/operation 512, the analysis and mapping computing entity 204 transmits the final bitstream to a routing network associated with a semiconductor device. The routing network may be configured to map the final bitstream to one or more input positions associated with one or more compute blocks. In some embodiments, the one or more compute blocks comprise one or more configurable logic blocks. The final bitstream may be used to configure a semiconductor device associated with the one or more compute blocks to perform one or more programmable functionalities.

Example Implementation of Various Embodiments

Various embodiments of the present disclosure may be configured to generate bitstreams that may be used in various functionalities, such as for neural network applications. Neural networks (NNs) may refer to data constructs that are commonly used in artificial intelligence applications to perform intelligent decision making. Achieving high performance with good energy efficiency is a challenge when such NNs are mapped on generic computing systems. The use of hardware accelerators may solve this issue. With the ability of dynamic partial reconfiguration, FPGAs provide such a solution. Alongside, FPGAs provide flexibility along with high speed and energy efficiency to execute various neural computing applications directly on hardware.

Security is an important issue for neural network applications on FPGAs. As the NN model is fixed and known to all, hence, the priority lies in the secrecy of the weights and biases. The weights and biases for a particular functionality may be generated based on training from several databases. Critical functionalities associated with sectors like defense, health, etc., may be based on training from several databases that are highly secret and not public. If such weights and biases are leaked to adversaries, then the secrecy of the system may be compromised. Thus, the element of confidentiality of such systems is associated with weights and biases. If weights and biases are leaked to an adversary, the entire system may be replicated. Thus, storing the weights and biases in off-chip memories and transferring them is not a viable solution. Weights and biases may be leaked during the transfer through covert side channels. As such, the disclosed BIBI framework may be used to generate the weights and biases and route them appropriately to the neural architecture.

According to various embodiments of the present disclosure, a BIBI framework may be integrated with an FPGA-based system that is configured with a neural architecture. The BIBI framework may comprise a LFSR configured to generate weights and biases (e.g., bitstream) that may be routed to appropriate locations of the neural architecture. Though the generated weights and biases may not exactly match the original ones, however, they are quite near to the actual ones and suffice for approximate computing applications.

For example, various weights needed for a particular functionality may be provided to the disclosed analysis and mapping computing entity 204 to select weight (rather than sequence) generating parameters, such as seed, structure, and size. The analysis and mapping computing entity 204 may vary the seed, structure, and size for the LFSR to identify a combination of seed, structure, and size of LFSR such that the closest weights may be generated. The analysis and mapping computing entity 204 may record which value of the LF SR is closest to which weight.

The disclosed neural network application may use example algorithms, such as Algorithm 1 and Algorithm 2 with reference to the Appendix.

Algorithm 1 depicts a mechanism of selecting weight generating parameters for the LFSR, e.g., values of its seed, size and structure. The weights of the functionality are received as input, denoted as $S_w$. Then the values of the LFSR's size ($\sigma_1$), seed ($\sigma_2$) and structure ($\sigma_3$) are varied from minimum to maximum. For a particular combination of size, seed and structure, a set of LFSR values will be generated, which is indicated by $S_l$.

Algorithm 2 uses $S_l$ and $S_w$ to find the $\tau\sigma$, a parameter that denotes summation of the minimum difference of the input weights from the LFSR generated values. To find $\tau\sigma$, one element is taken from the set of $S_w$ to find which value of $S_l$ is closest to it. This is recorded in the variable $S_l$. A pointer is set to the element of $S_l$ that is nearest to the element $S_w$.

This is performed for all the elements of $S_w$ and their related pointers are set up for corresponding values of $S_j$. If $\tau\sigma$ is less than the existing one, then its value is updated, and the stored pointer set is also updated. After checking all the combinations of size, seed and structure, a combination with the lowest $\tau\sigma$ is generated as the output, which is fed to the LFSR in the FPGA. The pointer set corresponding to the size, seed and structure is also used to configure the routing module in the FPGA.

Figure 6:
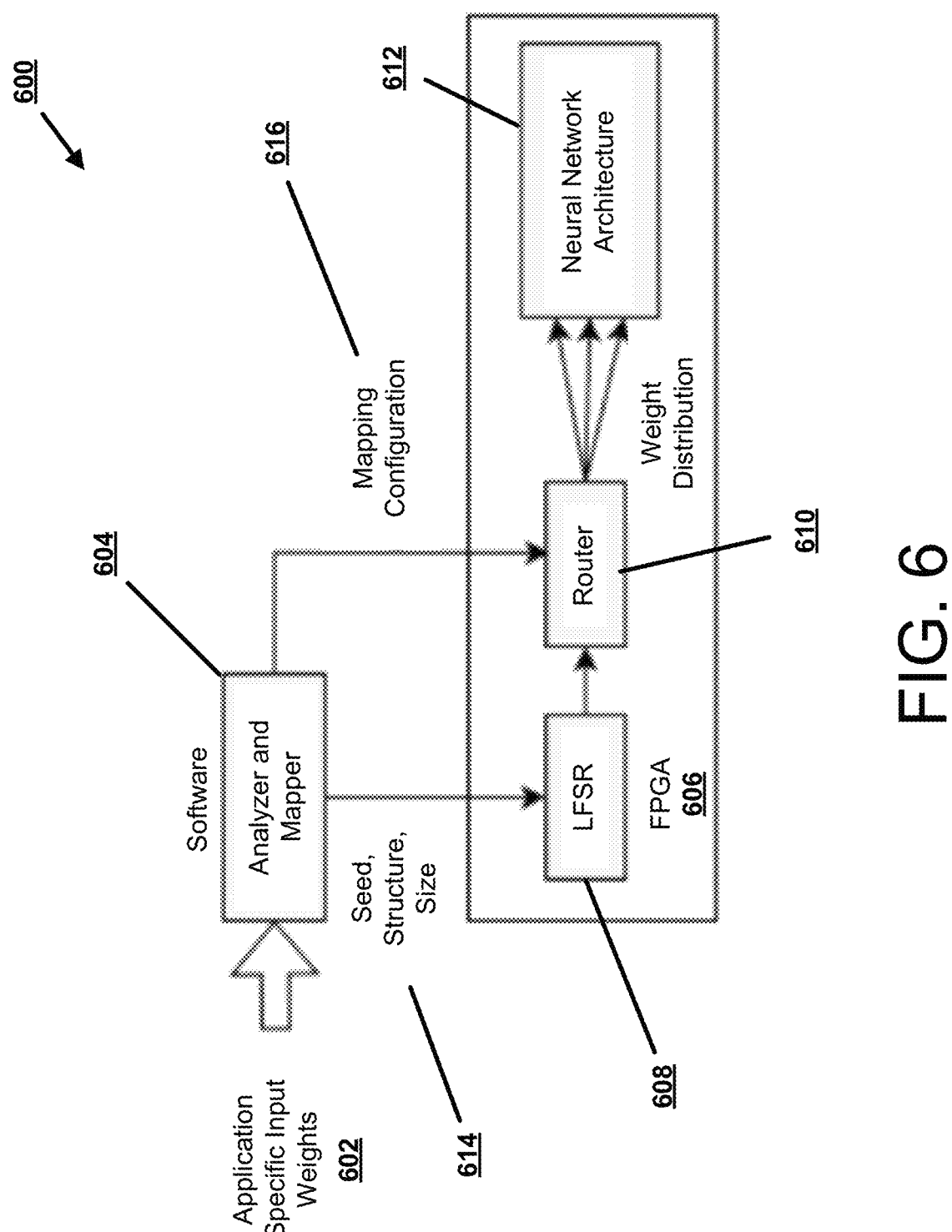
FIG. 6 illustrates an exemplary BIBI framework in accordance with some embodiments discussed herein.

An exemplary BIBI framework 600 is depicted in FIG. 6 in accordance with some embodiments discussed herein. The BIBI framework 600 comprises a FPGA 606 configured to receive seed, structure, and size weight generating parameters 614 (e.g., generated by Algorithm 1) and mapping configuration 616 (e.g., generated by Algorithm 2) from analyzer and mapper software 604 (that may be executed by analysis and mapping computing entity 204 based on application specific input weights 602. The FPGA 606 comprises a LFSR 608, a router 610, and a neural network architecture 612. The LFSR 608 may be configured in the FPGA 606 to generate weight and bias values based on the values of the seed, structure, and size weight generating parameters 614. The router 610 may be configured to map the weight and bias values of the LF SR to weights of the neural network architecture 612.

According to another aspect of the present disclosure, logic obfuscation and locking functionality may be provided by the disclosed BIBI framework. Hardware security is a major concern for both FPGA and ASIC designs. The current horizontal model of supply chain acquires different intellectual property (IP) blocks from IP vendors that are integrated to design a system-on-chip (SoC). As such, security threats, such as hardware Trojan insertion, overproduction, reverse engineering, and IP theft may be introduced. For both logic obfuscation and locking functionality, original functionality of the IP may be hidden by introducing additional blocks which may be controlled and programmed. The strength of these techniques may rely on the blocks used for obfuscation, their mapping algorithms, and how controlling inputs of the blocks are programmed during run-time.

Figure 7:
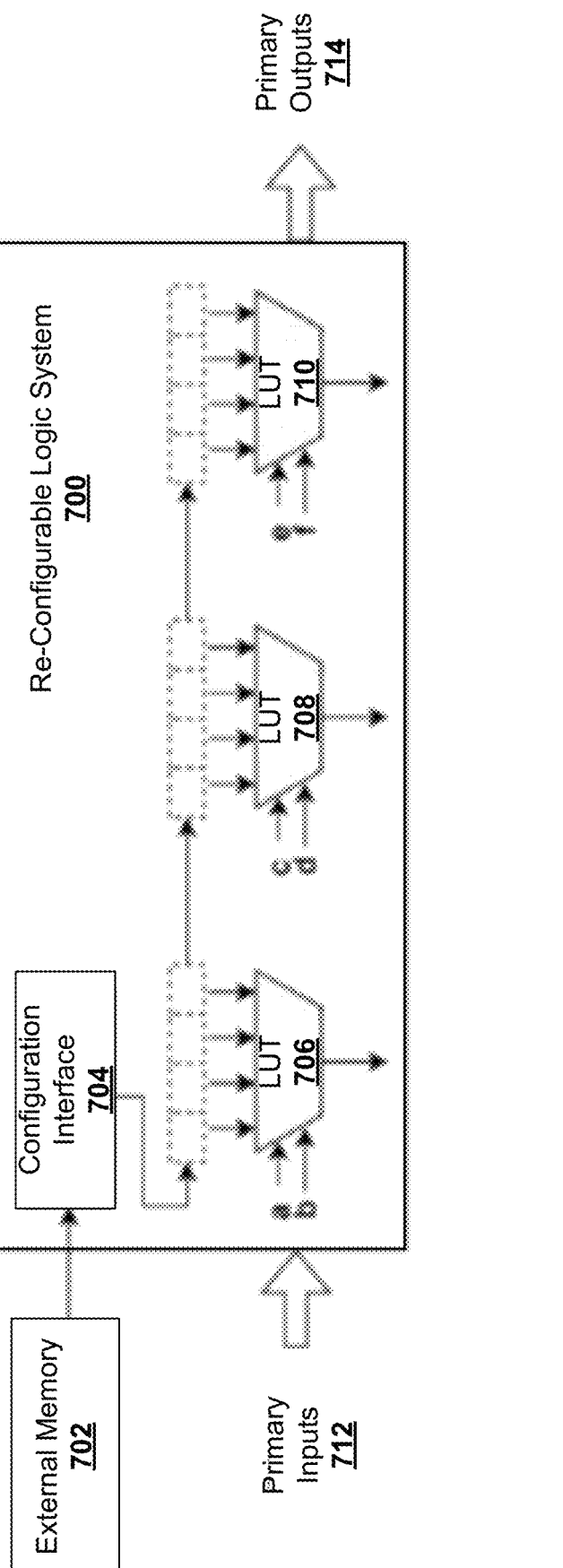
FIG. 7 illustrates a re-configurable logic system with external memory.

Re-configurable logic obfuscation may comprise removing a selected set of cells from a chip design and replacing them with re-configurable logic having multiple functions. The re-configurable logic blocks may be subsequently programmed to unlock the chip design. The re-configurable logic blocks may be programmed with a desired bitstream to achieve the correct functionality. The bitstream may be either stored off-chip as shown in FIG. 7 or it may be stored within the chip. Storing the bitstreams off-chip and introduction during run-time may lead to additional delay and data leakage during transfer. Storing the bitstreams within the chip may not be an option for cases where the size of the bitstream is too large compared to the size of the system.

An example re-configurable logic system 700 with external memory 702 is depicted in FIG. 7 in accordance with some embodiments discussed herein. As shown in FIG. 7, external memory 702 may be used to store bitstream configuration data. During run-time, the bitstream configuration data may be transferred via a configuration interface 704 to re-configurable logic blocks comprising look-up tables (LUTS) 706, 708, and 710 that are configured with the bitstream configuration data to achieve a desired functionality comprising primary outputs 714 based on primary inputs 712. However, such transfer of bitstream configuration data from the external memory 702 to the LUTS 706, 708, and 710 poses security concerns as the bitstream configuration data may be leaked during transfer resulting in leakage of secret information in critical applications.

Figure 8:
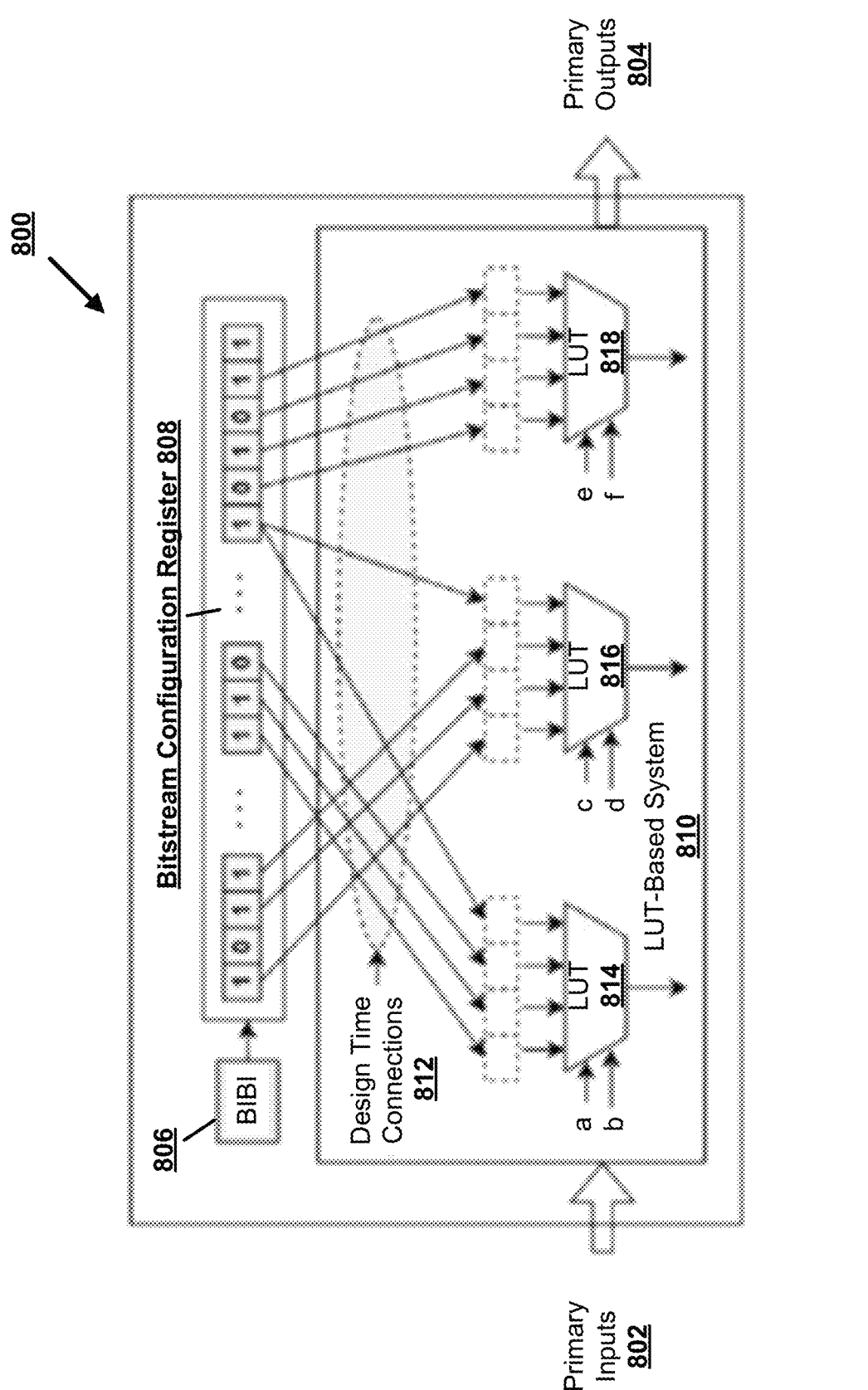
FIG. 8 illustrates a re-configurable logic system without external memory in accordance with some embodiments discussed herein.

A re-configurable logic system without external memory is depicted in FIG. 8 in accordance with some embodiments discussed herein. According to various embodiments of the present disclosure, a BIBI module 806 may be used to generate a bitstream with low area overhead and in a more secure manner. As shown in FIG. 8, a BIBI module 806 may be integrated with a LUT-based system 810 in order to generate a targeted functionality-specific bitstream via design time connections 812 (e.g., design constraints). A bitstream may be generated by the LUTS 814, 816, and 818 that matches with target functionality configuration data based on bitstream configuration bits loaded to a bitstream configuration register 808 by the BIBI module 806 to provide a correct functionality comprising primary outputs 804 based on primary inputs 802.

Figure 9:
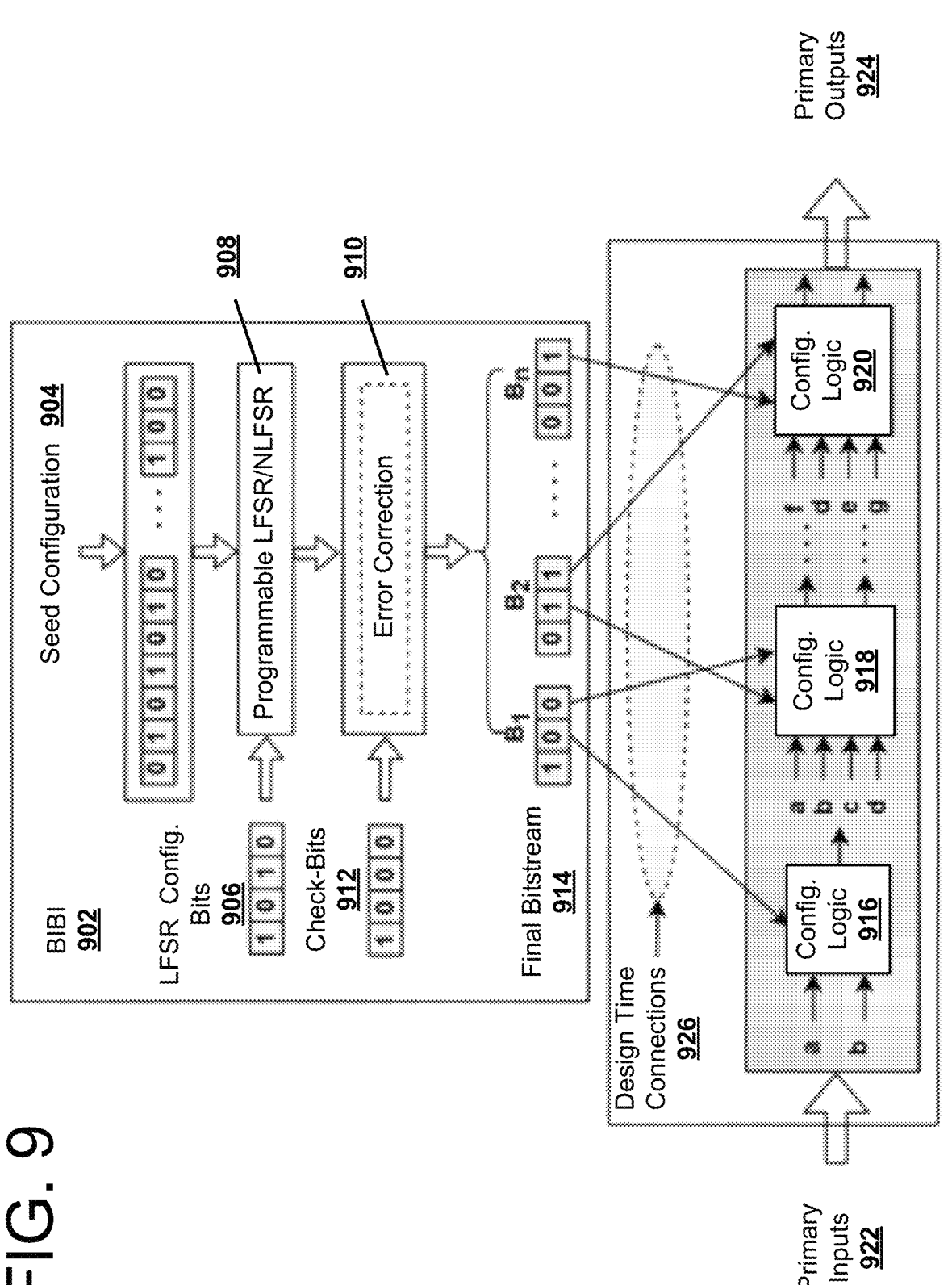
FIG. 9 illustrates an integration of a BIBI module in a design including configurable logic in accordance with some embodiments discussed herein.

Similarly, FIG. 9 depicts an integration of a BIBI module 902 in a semiconductor device design including configurable logic in accordance with some embodiments discussed herein. For correct functionality comprising primary outputs 924 based on primary inputs 922, a correct set of configuration bits from a final bitstream 914 may be provided to configurable logic blocks 916, 918, and 920. As depicted in FIG. 9, BIBI module 902 comprises a programmable LFSR/ NLFSR unit 908 that may be configured to generate a set of bitstream values based on sequence generating parameters comprising seed configuration 904 and LFSR configuration bits 906. An error correction block 910 may be used to correct bits with check-bits 912 to derive a final bitstream 914. Final bitstream 914 generated by the BIBI module 902 may be used to make appropriate connections to configurable logic blocks 916, 918, and 920 given design time connections 926 (design constraints, such as maximum fanout of a net, or maximum routing distance). If final bitstream 914 does not certain design constraints, a new set of bitstreams may be generated by changing sequence generating parameters at the programmable LFSR/NLFSR unit 908 and/or the error correction block 920 until the design constraints are satisfied.

CONCLUSION

Having thus described several aspects and embodiments of the technology set forth in the disclosure, it is to be appreciated that various alterations, modifications, and improvements will readily occur to those skilled in the art. Such alterations, modifications, and improvements are intended to be within the spirit and scope of the technology described herein. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein. Those skilled in the art will recognize or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

It should be understood that the examples and embodiments in the Appendix are also for illustrative purposes and are non-limiting in nature. The contents of the Appendix are incorporated herein by reference in their entirety.

APPENDIX

---

Algorithm 1: Working Mechanism for BIBI with Neutral Networks:
PC1: Pseudo-code for LFSR Selection

---

Input: NN Weights $S_W = [w_1, w_2, \ldots, w_n]$, Weight size: $\omega$
Output: FINAL_LFSR (Size ($\sigma_1$), Seed ($\sigma_2$), Structure ($\sigma_3$))
Output: FINAL_POINTER_SET $S_W \rightarrow S_l$, where $S_l$ is the set of
    values for a particular LFSR ($\sigma_1$, $\sigma_2$, $\sigma_3$)
Set $\tau\delta_{min} = \infty$, where $\tau\delta_{min}$ is the total difference value;

for Size=$\sigma_1^{min}$ to $\sigma_1^{max}$ do

|  If LFSR Size == Input Weight Size then

|   | for Seed=$\sigma_2^{min}$ to $\sigma_2^{max}$ do

|   |   | for Structure=$\sigma_3^{min}$ to $\sigma_3^{max}$ do

|   |   |   | Generate $S_l$ = Values of LFSR($\sigma_1$, $\sigma_2$, $\sigma_3$);
 |   |   |   | Execute PC2 and fetch $\tau\delta$ and Pointer_Set;
 |   |   |   | If $\tau\delta_{min}$ > $\tau\delta$ then
 |   |   |   |   | Set $\tau\delta_{min} = \tau\delta$;
 |   |   |   |   | Set Final_LFSR = LFSR(Size, Seed, Structure)
 |   |   |   |   | Set Final_Pointer_Set = Pointer_Set;
 |   |   |   | end
 |   |   | end
 |   | end
 | end
end
Output FINAL_LFSR, Final_Pointer_Set;

---

Algorithm 2: Working Mechanism for BIBI Neutral Networks:
PC2: Pseudo-code for determining mapping pointers and min
difference for $S_l$ and $S_w$

--- for i = 1 to n do

| set $\delta_i^{min} = \infty$; // $\delta_i^{min}$ is a variable that records the

| minimum difference between weight $W_i$ and LFSR value $L_j$;
 | for j = 1 to m do
 |  | $\delta_i = |W_i - L_j|$; // $\delta_i$ is a variable to evaluate the difference
 |  |    between weight $W_i$ and LFSR value $L_j$

|  | if $\delta_i^{min}$ > $\delta_i$ then

|  |   | Set $\delta_i^{min} = \delta_i$;

|  |   | Set Pointer_i = j; // i.e. $W_i$ of set $S_w$ must be mapped to $L_j$
 |  |   | of set $S_l$;
 |  | end

|  | Set $\tau\delta = \tau\delta_{min} + \delta_i^{min}$;

| end
 | Return Total_Difference, Pointer_Set (Pointer_i); // where i = 1
 | to n
end

---

The invention claimed is:

1. A semiconductor device comprising:
    a compute block; and
    a built-in bitstream initialization (BIBI) module that is coupled to the compute block via a routing network, wherein:
        (i) the BIBI module comprises:
            a sequence generator configured to generate a sequence of values by performing an operation on a set of one or more seed configuration bits in accordance with a set of one or more sequence generator configuration bits,
            a masking module configured to convert the sequence of values to a masked sequence of values by applying a mask corresponding to a given precision of bits to the sequence of values,
            an encryption module configured to generate an encrypted masked sequence of values by applying an encryption scheme to the masked sequence of values, and
            an error correction module configured to generate an error-corrected encrypted masked sequence of values by adding a set of one or more check-bits to the encrypted masked sequence of values,
        (ii) the BIBI module is configured to generate a bit-stream based on the error-corrected encrypted masked sequence of values,
        (iii) the bitstream is transmitted to the routing network, and
        (iv) the routing network is configured to map the bitstream to one or more input positions associated with the compute block.

2. The semiconductor device of claim 1, wherein the bitstream comprises data representative of a description of hardware, logic, routing, and initial values associated with one or more registers and on-chip memory comprising one or more look-up tables.

3. The semiconductor device of claim 2, wherein the data configures the semiconductor device to perform one or more programmable functionalities.

4. The semiconductor device of claim 1, wherein the semiconductor device comprises a field-programmable gate array or an application-specific integrated circuit.

5. The semiconductor device of claim 1, wherein the sequence generator comprises a linear feedback shift register or a non-linear feedback shift register.

6. The semiconductor device of claim 1, wherein the sequence generator is configured to generate the sequence of values based on one or more sequence generating parameters associated with seed, structure, and size.

7. The semiconductor device of claim 1, wherein the BIBI module is further configured to:
    generate the bitstream at a time of design; and
    generate one or more connections to one or more configurable logic blocks comprising the compute block.

8. The semiconductor device of claim 1, wherein the BIBI module is further configured to:
    generate one or more weights for a neural network associated with one or more computing operations.

9. A computer-implemented method comprising:
    generating, by one or more processors, a sequence of values by performing an operation on a set of one or more seed configuration bits in accordance with a set of one or more sequence generator configuration bits;
    converting, by the one or more processors, the sequence of values to a masked sequence of values by applying a mask corresponding to a given precision of bits to the sequence of values;

generating, by the one or more processors, an encrypted masked sequence of values by applying an encryption scheme to the masked sequence of values;

generating, by the one or more processors, an error-corrected encrypted masked sequence of values by adding a set of one or more check-bits to the encrypted masked sequence of values;

generating, by the one or more processors, a final bitstream based on the error-corrected encrypted masked sequence of values; and transmitting, by the one or more processors, the final bitstream to a routing network, the routing network configured to map the final bitstream to one or more input positions associated with one or more compute blocks.

10. The computer-implemented method of claim 9 further comprising generating the sequence of values based on one or more sequence generating parameters.

11. The computer-implemented method of claim 10 wherein the one or more sequence generating parameters comprise a seed configuration or a linear feedback shift register configuration.

12. The computer-implemented method of claim 9 wherein the one or more compute blocks comprise one or more configurable logic blocks.

13. The computer-implemented method of claim 9 wherein the sequence of values corresponds to data representative of a description of hardware, logic, routing, and initial values associated with one or more registers and on-chip memory comprising one or more look-up tables.

14. The computer-implemented method of claim 9, wherein the final bitstream configures a semiconductor device associated with the one or more compute blocks to perform one or more programmable functionalities.

15. One or more non-transitory computer-readable storage media storing instructions that, when executed by one or more processors, cause the one or more processors to perform operations comprising:

generating a sequence of values by performing an operation on a set of one or more seed configuration bits in accordance with a set of one or more sequence generator configuration bits;

converting, by the one or more processors, the sequence of values to a masked sequence of values by applying a mask corresponding to a given precision of bits to the sequence of values;

generating an encrypted masked sequence of values by applying an encryption scheme to the masked sequence of values;

generating an error-corrected encrypted masked sequence of values by adding a set of one or more check-bits to the encrypted masked sequence of values;

generating a final bitstream based on the error-corrected encrypted masked sequence of values; and transmitting the final bitstream to a routing network, the routing network configured to map the final bitstream to one or more input positions associated with one or more compute blocks.

16. The one or more non-transitory computer-readable storage media of claim 15, wherein the operations further comprise generating the sequence of values based on one or more sequence generating parameters.

17. The one or more non-transitory computer-readable storage media of claim 16, wherein the one or more sequence generating parameters comprise a seed configuration or a linear feedback shift register configuration.

18. The one or more non-transitory computer-readable storage media of claim 15, wherein the one or more compute blocks comprise one or more configurable logic blocks.

19. The one or more non-transitory computer-readable storage media of claim 15, wherein the sequence of values corresponds to data representative of a description of hardware, logic, routing, and initial values associated with one or more registers and on-chip memory comprising one or more look-up tables.

20. The one or more non-transitory computer-readable storage media of claim 15, wherein the final bitstream configures a semiconductor device associated with the one or more compute blocks to perform one or more programmable functionalities.

* * * * *